UNITED STATES PATENT OFFICE.

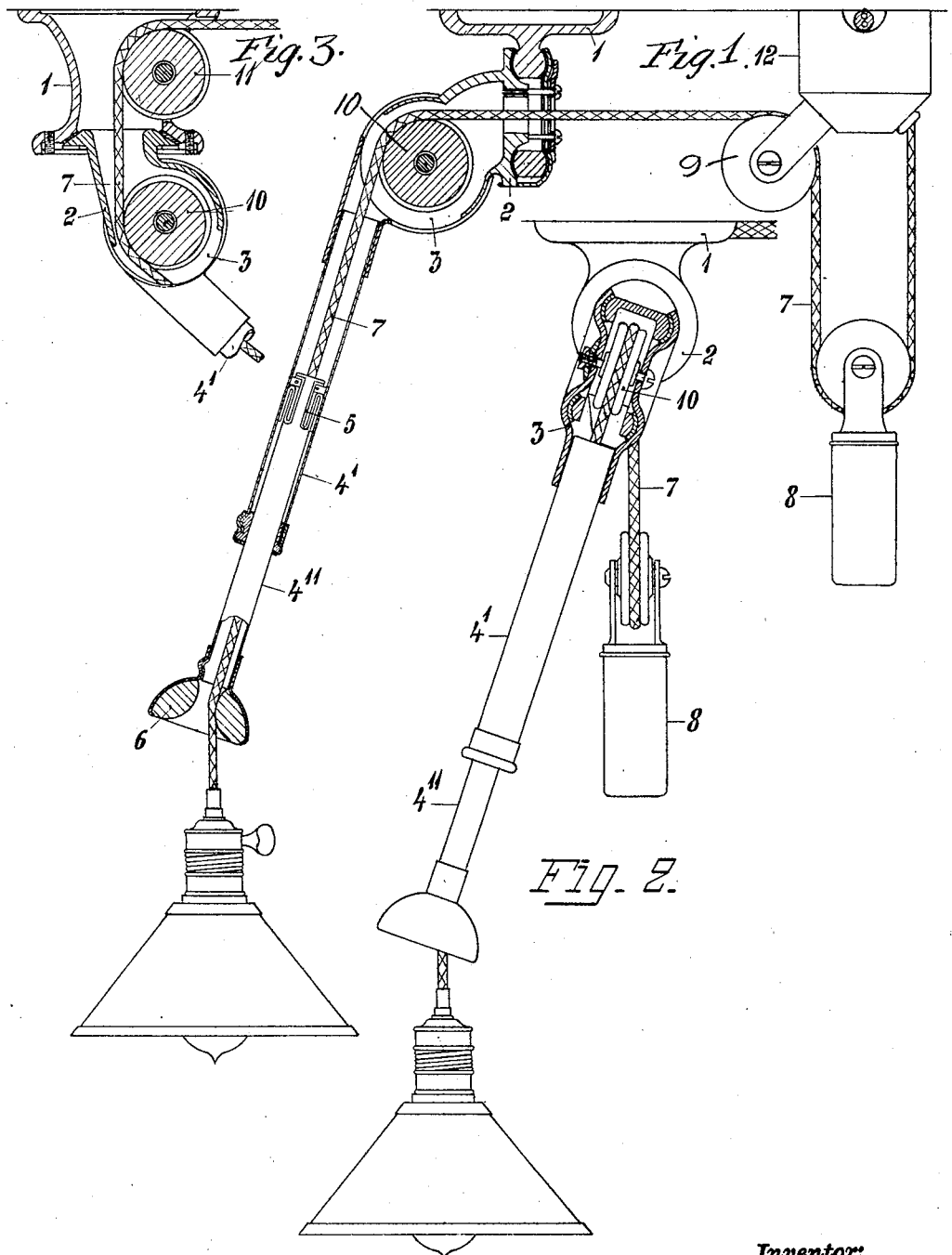

JOHAN PETTER JOHANSSON, OF FANNALUND, SWEDEN.

ADJUSTABLE SUPPORT FOR ELECTRIC LAMPS.

1,348,949.      Specification of Letters Patent.      Patented Aug. 10, 1920.

Application filed April 19, 1919. Serial No. 291,300.

*To all whom it may concern:*

Be it known that I, JOHAN PETTER JOHANSSON, director, citizen of the Kingdom of Sweden, residing at Fannalund, Entroping, Sweden, have invented certain new and useful Improvements in Adjustable Supports for Electric Lamps, of which the following is a specification.

The present invention has for its object improvements in adjustable supports for electric lamps of the type comprising an electric conductor arranged within a hollow telescopic stem secured to a double friction joint in such a manner that the said conductor can be drawn back and forth through the said joint and stem. The object of the invention is to simplify the construction, reduce the wear of the conductor and facilitate the adjustment and fixing of the different parts of the stem, so that they can be held in any desired position without any special locking means.

In the accompanying drawing two constructional forms of such a support are illustrated, one of which is shown in Figures 1 and 2 from two different sides, partly in section, while the second constructional form is shown in Fig. 3.

The double friction joint consists of three parts: the bracket 1 and the two friction joints 2 and 3 one 2 of which is pivotally clamped to the bracket 1, while the other 3 is pivotally clamped to the first one and connected to the telescopic stem 4. According to the invention the joints have axes extending perpendicularly to one another and arranged in such a manner that only one guiding roller 10 mounted in the joint 3 and co-axial therewith is sufficient for guiding the conductor through both the joints 2 and 3. For facilitating and simplifying the adjustment and locking of the telescopic stem in any desired position of its parts 4' and 4'' in relation to one another, these parts work under friction, for instance as illustrated in Figs. 1 and 2, by means of a spring-device 5, attached to the one end of the part 4'' and being in frictional contact with the other part 4'. The part 4'' in its outer free end is provided with a guiding member 6, preventing the contact between the electric conductor 7 and the inner walls of the stem. From the double joint the conductor is drawn to a connecting member 12 and the variations in the length of the conductor at the movement of the parts 4' and 4'' of the stem in relation to each other are taken up by a weight 8 of a gravity take-up including a guiding roller 9 from which the conductor 7 extends directly to the guiding roller 10 without requiring any guiding at the passage through the bracket 1 and the first joint 2.

In the constructional form according to Fig. 3, the axis of the joint 2 is vertical instead of horizontal and for suitably guiding the conductor 7 on its way to the gravity take-up the bracket 1 is provided with a guiding roller 11. The joint 2, however, in this case also is without any guiding roller.

I claim:

1. An adjustable support for electric lamps comprising a flexible electric conductor, a bracket, an annular friction joint carried by said bracket, a second friction joint carried by said annular joint and perpendicular thereto, a tangential extension on said second joint carrying a stem, said joints and stem being adapted to permit of the conductor passing freely therethrough, a single guiding roller for the conductor mounted in said second joint and co-axial therewith, the axis of both the annular joint and stem extending tangentially to said guiding roller.

2. An adjustable support for electric lamps comprising a flexible electric conductor, a bracket, an annular friction joint carried by said bracket, a second friction joint carried by said annular joint and perpendicular thereto, a tangential extension on said second joint carrying a telescopic stem, said joints and stem being adapted to permit of the conductor passing freely therethrough, means for taking up the slack in said conductor; a guiding member for the conductor at the free end of the said stem, and a single guiding roller for the conductor mounted in said second joint and co-axial therewith, the axis of both the annular joint and stem extending tangentially to said guiding roller, providing an arrangement whereby the conductor extends through the center of said annular joint in any position of said support.

In testimony whereof I affix my signature in presence of two witnesses.

JOHAN PETTER JOHANSSON.

Witnesses:
   HARRY HAMMAR,
   EMY WALIN.